United States Patent
Tigelaar et al.

(10) Patent No.: US 11,448,660 B2
(45) Date of Patent: Sep. 20, 2022

(54) FERRITE CORE COIL DEVICE, SENSOR DEVICE FOR DETERMINING ROTATIONAL SPEED OF A ROTATABLE OBJECT WITH SUCH A FERRITE CORE COIL DEVICE AND TURBOCHARGER WITH SUCH A SENSOR DEVICE

(71) Applicant: Jaquet Technology Group AG, Pratteln (CH)

(72) Inventors: Jonathan A. A. Tigelaar, Wintersingen (CH); Andreas Tuor, Pratteln (CH); Alexandru Istrate, Basel (CH); Loïc Libis, Uffheim (FR)

(73) Assignee: JAQUET TECHNOLOGY GROUP AG, Pratteln (CH)

( * ) Notice: Subject to any disclaimer, the term of this patent is extended or adjusted under 35 U.S.C. 154(b) by 189 days.

(21) Appl. No.: 16/911,533

(22) Filed: Jun. 25, 2020

(65) Prior Publication Data
US 2020/0408796 A1    Dec. 31, 2020

(30) Foreign Application Priority Data
Jun. 26, 2019   (EP) .................................. 19182660

(51) Int. Cl.
*G01P 3/48*    (2006.01)
*G01P 3/49*    (2006.01)
*F02B 37/00*   (2006.01)

(52) U.S. Cl.
CPC .................. *G01P 3/48* (2013.01); *G01P 3/49* (2013.01); *F02B 37/00* (2013.01)

(58) Field of Classification Search
CPC .............. G01P 3/48; G01P 3/49; F02B 37/00
See application file for complete search history.

(56) References Cited

U.S. PATENT DOCUMENTS

| | | | | |
|---|---|---|---|---|
| 5,486,758 A | * | 1/1996 | Hammerle | G01D 5/2006 324/173 |
| 7,608,346 B2 | * | 10/2009 | Braun | G01D 11/245 324/151 R |
| 2012/0013329 A1 | * | 1/2012 | Hattori | G01P 3/443 324/207.25 |
| 2015/0070004 A1 | | 3/2015 | Lerchenmueller et al. | |
| 2016/0187366 A1 | | 6/2016 | Tuor et al. | |
| 2018/0024158 A1 | * | 1/2018 | Sugiyama | G01P 3/46 324/173 |

FOREIGN PATENT DOCUMENTS

DE    102016118284 A1    5/2017

OTHER PUBLICATIONS

Extended European Search Report, dated Jan. 8, 2020, 7 pages, 19182660.1.
Abstract of DE102016118284, dated May 11, 2017, 1 page.

* cited by examiner

*Primary Examiner* — Reena Aurora

(57) ABSTRACT

A ferrite core coil device as a sensing element for a sensor device determining a rotational speed of a metallic rotatable object includes a coil having a first sector and a second sector and a ferrite core holding the coil. The ferrite core has a shape of a disk lacking a disk sector and defined by a contour of the disk and a chord of the disk. The chord forms a bending edge of the ferrite core. The first sector of the coil is not arranged on a bed of the ferrite core and the second sector of the coil is arranged on the bed. The first sector is bent around the bending edge at a bending angle with respect to the second sector.

18 Claims, 4 Drawing Sheets

FERRITE CORE COIL DEVICE, SENSOR DEVICE FOR DETERMINING ROTATIONAL SPEED OF A ROTATABLE OBJECT WITH SUCH A FERRITE CORE COIL DEVICE AND TURBOCHARGER WITH SUCH A SENSOR DEVICE

CROSS-REFERENCE TO RELATED APPLICATION

This application claims the benefit of the filing date under 35 U.S.C. § 119(a)-(d) of European Patent Application No. 19182660, filed on Jun. 26, 2019.

FIELD OF THE INVENTION

The present invention relates to a ferrite core coil device and, more particularly, to a ferrite core coil device for a sensor device.

BACKGROUND

A turbocharger converts waste energy in the exhaust gas of an automotive engine into compressed air, which is then forced back into the automotive engine. This results in the engine burning more fuel and thus producing more power, while less energy is consumed, thereby improving the overall efficiency of the combustion process. A turbocharger typically comprises a turbine wheel and a compressor wheel, which are connected by a common shaft supported on a bearing system. The turbine wheel is driven by the exhaust gas which in turn drives the compressor wheel, the compressor wheel drawing in and compressing ambient air which is then fed into the engine's cylinders. By turbocharging, the performance level of smaller engines can be increased up to the performance level of bigger engines without turbocharging, with lower fuel consumption and emissions. Consequently, turbochargers are increasingly employed with diesel and gasoline engines in passenger, commercial, off-road and sport vehicles.

Determining rotational speed of the compressor wheel of a turbocharger is important for optimizing its efficiency, and for ensuring that a turbocharger and engine stay within their respective safe operational ranges. Today's turbochargers need to operate reliably and continuously with increasingly higher exhaust gas temperatures and compressor inlet temperatures. Compared with its diesel counterpart, a modern gasoline turbocharger has to operate in a much higher underhood temperature environment, with temperatures at the compressor wheel being around 200° C. or above. Modern turbocharger compressor wheels are typically constructed from strong, lightweight conductive materials such as aluminum, titanium or magnesium which can tolerate high stresses. Rotational speed of such compressor wheels can be measured, preferably by means of an active eddy current principle, wherein a magnetic field is generated by an oscillating system and a sensing coil is used to detect compressor blades when they pass through the magnetic field in front of the sensor tip.

Turbocharger speed sensors are often implemented by connecting a sensor head/sensor tip with the sensing element that is located close to the compressor wheel via a cable to the sensor electronics.

Applications for measurement of turbocharger speed are challenging in that impeller/compressor wheels (the target wheels) are typically very thin (a few tenths of a millimeter; in particular for passenger cars) and therefore deliver a low signal. Also the sensing distance/air gap, i.e. the distance between the sensing element, typically a standard flat coil such as a pancake coil) and the target (the blades), varies as the coil is flat while the interior wall of the turbocharger housing is round/saddle-shaped and the envelope of the impeller/compressor wheel is curved.

Generally speaking, amongst other factors, the coil type used as sensing element has a decisive impact on the detection signal shape. In order to reach a reliable rotation speed calculation, the detection signal should preferably exhibit an as sharp as possible signal peak with sufficient amplitude every time when a blade passes in front of the sensor tip. If for example the amplitude of the signal peak is not large enough (i.e. the signal is not strong enough), no peak may be detected, which in turn would lead to an erroneous rotation speed. Typically, the amplitude of the detection signal decreases with decreasing blade thickness, which consequently makes it more difficult to detect thin blades. Outer influences such as the casing of the device incorporating the sensor also play an important role and can produce signal amplitude modulation losses of up to 50%.

Beside the problem of weak signals for thin blades, all these solutions have another common problem, which is the occurrence of so called "double peaks" in the detection signal. This means that one single peak may in fact show two peaks. This may also lead to an erroneous rotation speed as the system may interpret the double peaks as two distinct single peaks, that is: two blade passages instead of one.

These properties of the output signal of a sensing element for a turbocharger cause problems for available solutions to the extent that the measured rpm (rotations per minute) values may be erroneous.

In known applications relatively large coils are employed to obtain a strong enough output signal. However, in turbocharger applications there is a need for small sensing elements/coils to permit a small/thin sensor device tip in order to avoid negative side effects such as hot spots and aerodynamic disturbances which may have a negative impact on the turbocharger's functioning. With a large flat coil used in available solutions, disturbing effects of varying sensing distance/air gap are even stronger. Furthermore, sensor tips with such a large coil are too big to be inserted into small turbochargers of the new generation.

SUMMARY

A ferrite core coil device as a sensing element for a sensor device determining a rotational speed of a metallic rotatable object includes a coil having a first sector and a second sector and a ferrite core holding the coil. The ferrite core has a shape of a disk lacking a disk sector and defined by a contour of the disk and a chord of the disk. The chord forms a bending edge of the ferrite core. The first sector of the coil is not arranged on a bed of the ferrite core and the second sector of the coil is arranged on the bed. The first sector is bent around the bending edge at a bending angle with respect to the second sector.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
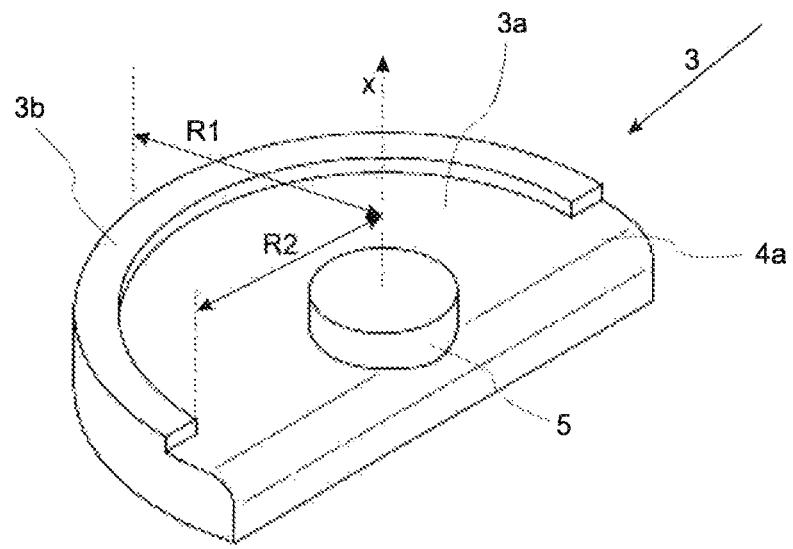
FIG. 1 is a perspective view of a ferrite core according to an embodiment.

The invention will now be described in greater detail and in an exemplary manner using embodiments with reference to the drawings, wherein like reference numerals refer to like elements. The described embodiments are only possible configurations, and the individual features as described herein can be provided independently of one another or can be omitted.

For the purposes of the invention, a rotatable object may e.g. be a compressor wheel of a turbocharger as for example used in automobiles, but shall not be limited thereto. The invention may also be applied to a variety of rotating objects, provided that these objects are made of a metal suitable for the detection method described herein or contain a sufficient amount of such metal.

The term "metallic" in connection with the rotatable object is understood here as encompassing a metal or a metal alloy, but the rotatable object may also comprise other materials like plastic, in general provided that the metal amount/conductivity is sufficient for triggering detectable signal peaks with the invention.

The term "chord" used throughout this document is understood in its mathematical sense as a "chord of a circle" and is hence defined as a line segment whose endpoints both lie on the circle. However, for the purposes of the invention, the term chord shall also imply a curved line with a curvature larger than the curvature of the circle cut by the chord (i.e. with a smaller radius than the radius of the circle).

The term "radius" is used here as seen from the central axis x of the ferrite core coil device.

Figure 2:
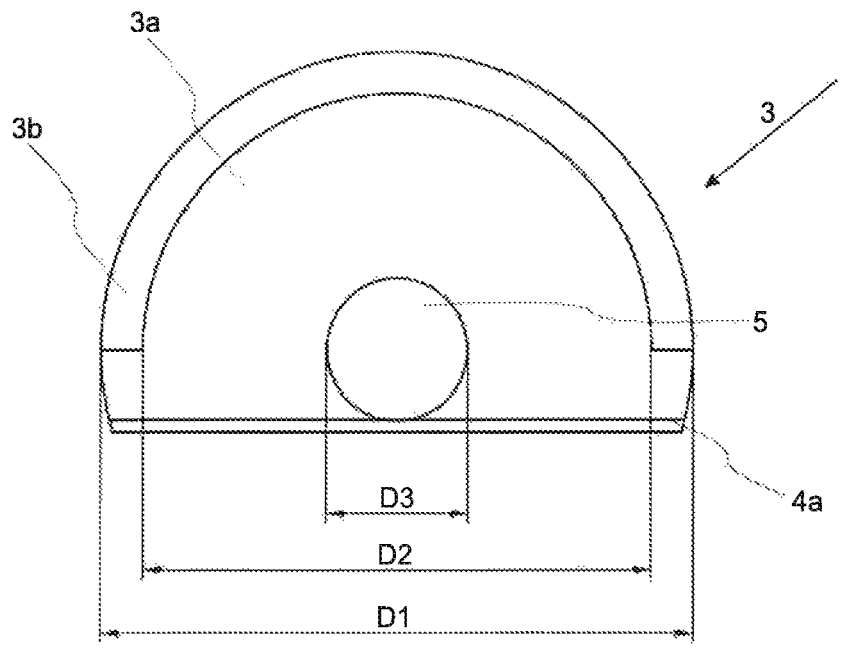
FIG. 2 is a top view of the ferrite core of FIG. 1.
Figure 3:
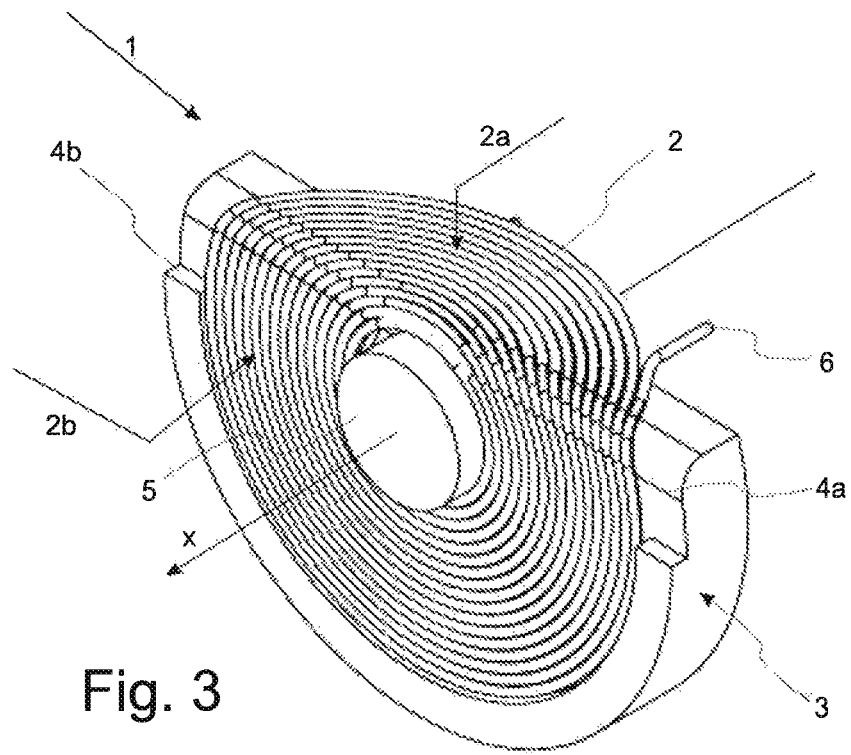
FIG. 3 is a perspective view of a ferrite core coil device according to an embodiment.

A ferrite core 3 for a ferrite core coil device 1 according to an embodiment is shown in FIGS. 1 and 2. As shown in FIGS. 1 and 2, the ferrite core 3 has the shape of a disk without a disk sector, with a maximum diameter D1. The ferrite core 3 is delimited by the contour of the disk and by a chord 4a of the disk. Hence, a size of the remaining disk sector is defined by a distance of the chord 4a from a central axis x of the ferrite core coil device 1. The ferrite core 3 also has a bed 3a as a surface for placing a coil 2, as shown in FIG. 3, which bed 3a has a maximum diameter D2. The bed 3a is delimited by an edge wall 3b of the ferrite core 3, which extends along said contour of the disk, and by the chord 4a which marks a bending edge of the ferrite core 3. The edge wall 3b therefore has a thickness given by D1-D2.

The ferrite core 3, as shown in FIGS. 1 and 2, has a pin 5 which protrudes from the bed 3a. In the shown embodiment, the pin 5 has a circular cross-section with diameter D3 and therefore an overall cylindrical shape. The pin 5 has the same axis as the ferrite core 3. The pin 5 has substantially a same height 4b from the bed 3a as the edge wall 3b, as shown in FIG. 3, but it can also slightly exceed the height 4b of the edge wall 3b in an embodiment. In other embodiments, the ferrite core coil device 1 may be used without the pin 5. However, it has been found that usage of pin 5 increases performance of the coil device 1. Furthermore, the attachment of the coil described below is more robust as the coil can't shift. In an embodiment, the ferrite core 3 has a thickness between 0.2 mm and 2 mm. In an embodiment, the ferrite core 3 has a relative permeability µr between 50 and 3000.

Figure 4:
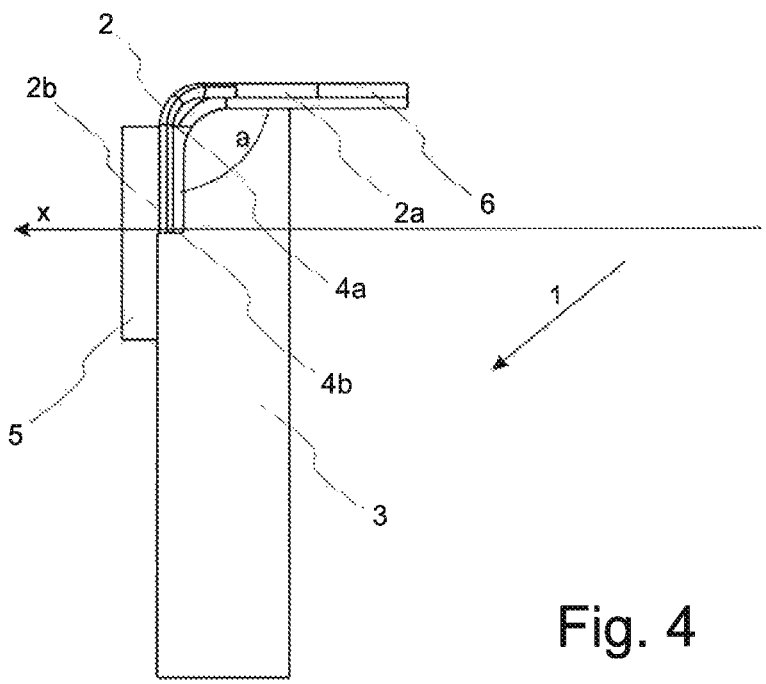
FIG. 4 is a side view of the ferrite core coil device of FIG. 3.

The ferrite core coil device 1 according to an embodiment is shown in FIGS. 3 and 4. The ferrite core coil device 1 includes an electromagnetic coil 2 supported on the ferrite core 3 of FIG. 1. An output connector 6 of the coil 2 is shown in FIG. 3, by which the coil 2 can be connected to external circuitry used to process the signal delivered by the coil device 1. The coil 2 is wound around pin 5 and, in an embodiment, has between 10 and 30 windings. In an embodiment, the coil 2 occupies with no gaps substantially the entire surface between the edge wall 3b and the pin 5, whereas a radius R2 of the wound coil 2 is smaller than a radius R1 of the ferrite core 3, as shown in FIG. 1.

As shown in FIGS. 3 and 4, the coil 2 is divided into two sections, of which a first sector 2a of the coil 2 is bent around and along the bending edge 4a (the chord). The coil 2 is bent in such a way that it substantially forms an L-shaped coil. A second sector 2b of the coil 2 rests on the bed 3a. A ratio between the first sector 2a of the coil 2 and the second sector 2b of the coil 2 is between 1:1 and 1.5:1. As mentioned before, the pin 5 is cylindrical in an embodiment. Depending on the ratio between the two sectors 2a, 2b of the coil 2, which indirectly may define dimensions of the ferrite core 3 as well, the pin 5 may have a similar shape as the disk itself. This is particularly the case for the 1:1 ratio between the sectors 2a, 2b. In this case the pin 5 has a cross section of a half circle as seen up to the bending edge 4a. The dimensions in the example shown in FIG. 1 are such that the pin 5 is just still a full circle.

In embodiments, the coil 2 is printed on a flexible polymer substrate. The material for the flexible polymer substrate is chosen to be highly heat-resistant, in particular to withstand temperatures at least up to 200° C., and in an embodiment at least up to 230° C. Suitable materials are for example liquid crystal polymers or polyimides. The flexible polymer substrate also protects the coil 2 against breakage as it may otherwise break due to its inherent fragility. Another advantage of this approach is the simplicity of the mounting process, as the coil 2 doesn't have to be wound around pin 5 manually or by machine.

FIG. 4 shows a side view of the ferrite core coil device 1 of FIG. 3, which emphasizes the L shape of the coil 2. As mentioned, the coil 2 is bent around and along the bending edge 4a, with the two thereby formed sectors 2a, 2b at a bending angle a with respect to one another. In an embodiment, the bending angle a is between 70 and 110 degrees. The present example has been chosen with a bending angle a of 90° which yield best results for the present exemplary application. An increase of the bending angle a above 90° will result in a reduction of the signal amplitude, as the magnetic field is increasingly opposed. A reduction of the bending angle a below 90° towards a flat pancake coil will result in the signal showing double-pulse behavior at thin blades. These effects are particularly pronounced for blade thicknesses below 1 mm.

The chord 4a, which delimits the bed 3a, is regarded as a line where the bed 3a ends and a curvature of the bending area starts. This curvature, which is illustrated by the curved area at the line 4a in FIGS. 3 and 4, is such that, taking into account the wire thickness of the coil 2, the bent area of the coil 2 snuggles smoothly on this curved surface. In any case the curvature is not chosen too high such that no sharp edge is created, which could damage the coil wire or cause a folding of the coil wire, which is not desired.

Figure 5:
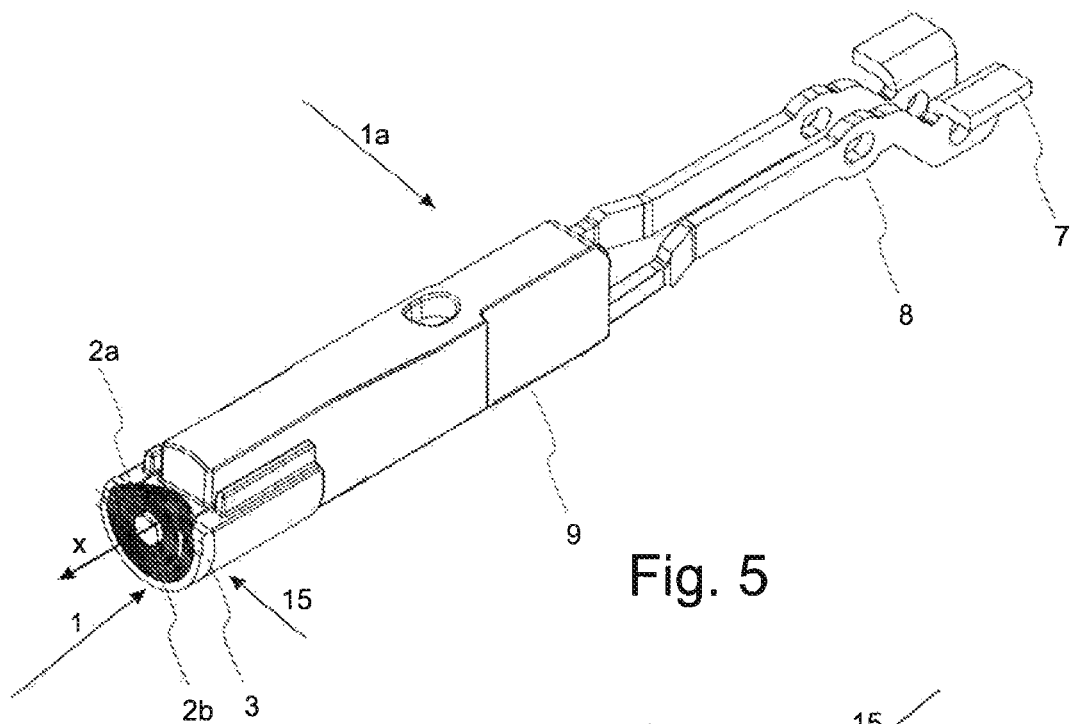
FIG. 5 is a perspective view of a sensor device with the ferrite core coil device of FIG. 3.
Figure 6:
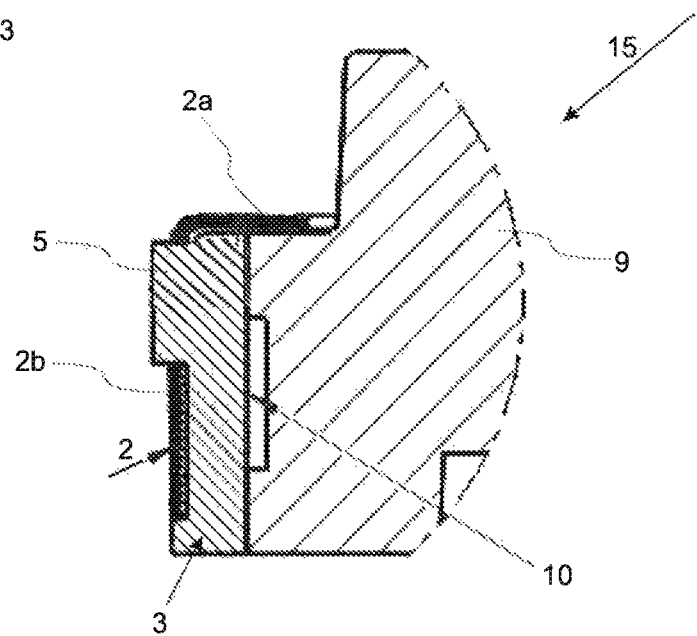
FIG. 6 is a sectional view of a sensor tip of the sensor device of FIG. 5.

A sensor device 1a according to an embodiment with the ferrite core coil device 1 of FIG. 3 is shown in FIG. 5, and a detail cross-sectional view of a sensor tip 15 of the sensor device 1a is shown in FIG. 6. The sensor device 1a for determining rotational speed of a rotatable object includes a sensor housing (not shown) with a connector segment 7, a mounting segment 8, and a sensor segment 9. The above-mentioned ferrite core coil device 1, i.e. the sensing element, is arranged at the sensor tip 15 of the sensor segment 9. FIG. 6 illustrates how the ferrite core coil device 1 is attached to the sensor segment 9 of the sensor device 1a at the line 10. For this purpose the tip 15 of the sensor segment 9 has substantially the same surface as the ferrite core 3 in the present example, with a stepped section for accommodating the bent first sector 2a of the coil 2. The stepped design advantageously provides a support for the first sector 2a of the coil 2. The diameter of the sensor segment tip 15 must not necessarily match the diameter D1 of the coil device 1.

The ferrite core coil device 1 is connected to sensor electronics for evaluating the output signal of the sensing element 1, which is arranged inside the sensor segment 9 as shown in FIGS. 5 and 6. The sensor electronics include an integrated SOI (silicon-on-insulator) circuit, in particular in form of an ASIC. Use of such a SOI circuit has proved advantageous to the extent that it can withstand high temperatures and is therefore suitable for use in difficult environments like inside a turbocharger. In particular, the ASIC may be configured for the following parameters/features: number of blades (divider), debouncer, output pulse width, maximum frequency range of the output signal, error detection frequency range, detection threshold and hysteresis, short circuit detection time, over temperature shutdown threshold, oscillator trimming, demodulator trimming, bandgap trimming, and/or error flagging disabling and enabling. Error flagging disabling and enabling may especially concern: coilbreak (breaking of the sensing element 1), over-temperature detection (regarding sensor device 1a environment), data-integrity detection, overvoltage and undervoltage detection (e.g. to protect an engine control unit which the sensor device 1a is connected to), frequency error (e.g., whether compressor wheel speed is too low). Thus, a diagnosis function/system may be incorporated into the ASIC and configured in an application dependent way, the diagnosis system monitoring overvoltage and undervoltage, overtemperature, data integrity, frequency error, coil/sensing element breakage, and/or short circuits.

Figure 7:
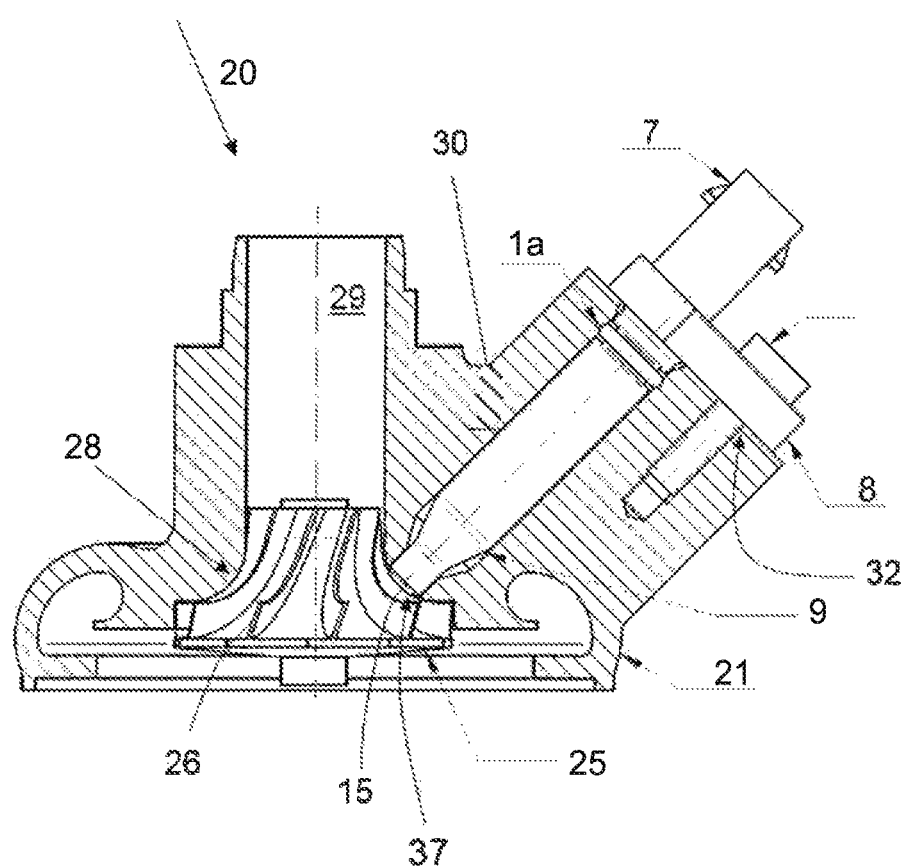
FIG. 7 is a sectional side view of a turbocharger according to an embodiment with the sensor device of FIG. 5.

A turbocharger 20 according to an embodiment is shown in FIG. 7 with the sensor device 1a of FIGS. 5 and 6 incorporated. The turbocharger 20 has a turbocharger housing 21. A compressor wheel or impeller 28 attached to a shaft with a compressor inlet 29 is arranged inside the turbocharger housing 21 and is connected to a turbine wheel by a shaft (not shown). A wall 30 (hashed area) of the turbocharger housing 21 is provided with a recess in which at least the sensor segment 9 of the sensor device 1a can be introduced and affixed in the intended operating position.

As shown in FIG. 7, the connector segment 7 of the sensor device 1a is connected to the sensor electronics for further processing the sensor signal. The mounting segment 8 is formed as a flange with an insert hole through which a bolt or other securing devices can be passed for secure attachment of the sensor device 1a on the outside of the turbocharger housing 21. The sensor segment 9 of the sensor device 1a is positioned such that the sensor tip 15, i.e. the ferrite core coil device 1 of the sensor device 1a, faces a plurality of blades 26 of the compressor wheel 28, as shown in FIG. 7. In embodiments, the bore accommodating the sensor device 1a tapers towards the sensor tip 15 which may have a smaller diameter than the rest of the sensor device 1a. In this way it is made sure that the sensor tip 15 is tightly fit into the tapered section of the bore.

In the following, the method for installation and operation of the sensor device 1a is described in more detail in connection with the underlying measurement principle of the ferrite core coil device 1, which was shortly outlined at the beginning.

For measuring rotational speed of the compressor wheel 28, the sensing element 1 is part of an oscillator tank formed by the coil 2, a capacitor, and the integrated SOI circuit/ASIC. This leads to the generation of an electromagnetic field around the sensing element 1, whose magnetic flux lines "step out" of the plane of the sensing element 1. If an electrically conducting target/object such as an impeller/compressor blade 26 approaches the sensing element 1, the magnetic flux lines pass through the blades 26 and induce eddy currents therein. The eddy currents within the blades 26 also generate an electromagnetic field counteracting the electromagnetic field generated by the sensing element 1, thereby affecting the impedance of the sensing element 1, and therefore the oscillation frequency. The eddy current effect increases when a blade 26 approaches the sensing element 1. The changing impedance of the sensing element 1 is reflected in modulation of the oscillation frequency. Evaluating this frequency by the sensor electronics and/or an engine control unit results in current or voltage signals that correspond to the rotational speed of the impeller/compressor wheel blades 26, such that the rotational speed can be determined.

As mentioned, the sensor device 1a is placed such that the sensor tip 15 is at the predefined distance from the rotatable object. In the specific example of the turbocharger 20 of FIG. 7, the tubular sensor device 1a is introduced into the recess in the wall 30 of the turbocharger 20 and inserted therein until the sensor tip 15 is at the specified distance from the impeller. This can be seen in FIG. 7 at the location indicated by arrow 37. In an embodiment, this distance is between 0.5 and 1 mm from the rotating impeller.

Generally, after connecting the sensor 1a to the sensor electronics for further processing, an electrical input current is applied to the ferrite core coil device 1 and an amplitude modulated output voltage signal is read as output of the sensor device 1a and processed by the sensor electronics. The sensor electronics determine the rotational speed of the impeller by evaluating a demodulated output voltage signal of the sensor device 1a.

The sensor device 1a may be used for turbocharger compression wheel blade 26 sensing for example in automotive, truck, off-highway vehicle, aerospace or power generation applications. The sensor device 1a may furthermore be used in any application where rotational speed needs to be measured/detected, in particular in applications of small size and/or with high ambient temperatures and/or where target/object materials are of lower electrical conductivity than aluminum (e.g., impeller blades with thin geometry made of for example titanium). But the invention may be integrated in all types of industrial machines containing rotating parts, e.g. in manufacturing lines, etc., particularly for applications requiring a high reliability of rotating parts. The turbocharger 20 is used in automobile motors but may also be used for other applications particularly related to propulsion technologies including aerospace, etc.

By using the ferrite core 3 together with the L-coil 2, the signal amplitude can be increased, whereas the ferrite core 3 acts like an amplifier of the detection signal. Thereby, a more reliable differentiation between distinct "real" signal peaks is reached. At the same time, the shape and relative arrangement of the coil 2 and ferrite core 3 of the sensor device 1*a* makes it possible to avoid double peaks entirely (even for thin coils of ca. 0.2 mm) and advantageously reach an increased sensor sensitivity as compared to known sensors and makes possible a better and even error-free signal peak detection. Thereby the risk of false assumption (detection) of the presence of two signal peaks (i.e. two blade passages) instead of one is minimized or avoided. Furthermore, the increased sensor sensitivity allows to increase the distance between the sensor device 1*a* and the blade, i.e. the air gap, thereby simplifying the production process, as positioning of the sensor requires less accuracy than in known solutions.

It is to be understood that while certain embodiments of the present invention have been illustrated and described herein, it is not to be limited to the specific embodiments described and shown. Therefore, terms like "preferred" or "in particular" or "particularly" or "advantageously", etc. signify optional and exemplary embodiments only.

What is claimed is:

1. A ferrite core coil device as a sensing element for a sensor device determining a rotational speed of a metallic rotatable object, comprising:
   a coil having a first sector and a second sector; and
   a ferrite core holding the coil, the ferrite core has a shape of a disk lacking a disk sector and defined by a contour of the disk and a chord of the disk, the chord forms a bending edge of the ferrite core, the first sector of the coil is not arranged on a bed of the ferrite core and the second sector of the coil is arranged on the bed, the first sector is bent around the bending edge at a bending angle with respect to the second sector.

2. The ferrite core coil device of claim 1, wherein the ferrite core has a pin protruding from the bed, the pin has a same axis as the ferrite core.

3. The ferrite core coil device of claim 2, wherein the coil is wound around the pin.

4. The ferrite core coil device of claim 2, wherein the bed is delimited by a supporting edge wall of the ferrite core extending along the contour of the disk and by the bending edge.

5. The ferrite core coil device of claim 4, wherein the pin has substantially a same height from the bed as the supporting edge wall.

6. The ferrite core coil device of claim 1, wherein a radius of the coil is smaller than a radius of the ferrite core.

7. The ferrite core coil device of claim 1, wherein a ratio between the first sector of the coil and the second sector of the coil is between 1:1 and 1.5:1.

8. The ferrite core coil device of claim 1, wherein the bending angle is between 70 and 110 degrees.

9. The ferrite core coil device of claim 8, wherein the coil is a substantially L-shaped coil with a bending angle of 90°.

10. The ferrite core coil device of claim 1, wherein the coil has between ten and thirty windings.

11. The ferrite core coil device of claim 1, wherein the coil has a plurality of windings each in contact with the bed.

12. The ferrite core coil device of claim 1, wherein the coil is printed on a flexible polymer substrate.

13. The ferrite core coil device of claim 1, wherein the ferrite core has a thickness between 0.2 mm and 2 mm.

14. The ferrite core coil device of claim 1, wherein the ferrite core has a relative permeability between 50 and 3000.

15. A sensor device for determining rotational speed of a rotatable object, comprising:
   a sensor segment;
   a mounting segment;
   a connector segment; and
   a ferrite core coil device arranged at a sensor tip of the sensor segment, the ferrite core coil device including a coil having a first sector and a second sector and a ferrite core holding the coil, the ferrite core has a shape of a disk lacking a disk sector and defined by a contour of the disk and a chord of the disk, the chord forms a bending edge of the ferrite core, the first sector of the coil is not arranged on a bed of the ferrite core and the second sector of the coil is arranged on the bed, the first sector is bent around the bending edge at a bending angle with respect to the second sector.

16. A turbocharger, comprising:
   a turbocharger housing;
   a compressor impeller arranged in the turbocharger housing; and
   a sensor device including a sensor segment, a mounting segment, a connector segment, and a ferrite core coil device arranged at a sensor tip of the sensor segment, the ferrite core coil device including a coil having a first sector and a second sector and a ferrite core holding the coil, the ferrite core has a shape of a disk lacking a disk sector and defined by a contour of the disk and a chord of the disk, the chord forms a bending edge of the ferrite core, the first sector of the coil is not arranged on a bed of the ferrite core and the second sector of the coil is arranged on the bed, the first sector is bent around the bending edge at a bending angle with respect to the second sector, the sensor segment is arranged in a wall of the turbocharger housing that has a recess, the ferrite core coil device protrudes through the wall and faces the compressor impeller at a predefined distance from the compressor impeller.

17. The turbocharger of claim 16, wherein the predefined distance is between 0.5 and 1 mm.

18. A method for determining a rotational speed of a rotatable object, comprising:
   providing a sensor device including a sensor segment, a mounting segment, a connector segment, and a ferrite core coil device arranged at a sensor tip of the sensor segment, the ferrite core coil device including a coil having a first sector and a second sector and a ferrite core holding the coil, the ferrite core has a shape of a disk lacking a disk sector and defined by a contour of the disk and a chord of the disk, the chord forms a bending edge of the ferrite core, the first sector of the coil is not arranged on a bed of the ferrite core and the second sector of the coil is arranged on the bed, the first sector is bent around the bending edge at a bending angle with respect to the second sector;
   placing the sensor device with the sensor tip at a predefined distance from the rotatable object;
   applying an electrical input current to the ferrite core coil device;
   reading an amplitude modulated output voltage signal output from the sensor device; and
   determining the rotational speed by evaluating a demodulated output voltage signal of the sensor device.

\* \* \* \* \*